US009353242B2

(12) United States Patent  
Guastala et al.

(10) Patent No.: US 9,353,242 B2  
(45) Date of Patent: May 31, 2016

(54) COMPOSITE MATERIAL COMPRISING UHMWPE AND IRON ORE TAILING AND USE OF IRON ORE TAILING IN PREPARATION OF COMPOSITE MATERIAL

(71) Applicant: VALE S.A., Rio de Janeiro (BR)

(72) Inventors: Fabio Arielo Guastala, Vitória (BR); Jael Moutinho Dos Santos, Vila Velha (BR)

(73) Assignee: VALE S.A., Rio De Janeiro (BR)

( * ) Notice: Subject to any disclaimer, the term of this patent is extended or adjusted under 35 U.S.C. 154(b) by 0 days.

(21) Appl. No.: 14/162,421

(22) Filed: Jan. 23, 2014

(65) Prior Publication Data

US 2014/0206808 A1    Jul. 24, 2014

Related U.S. Application Data

(60) Provisional application No. 61/755,803, filed on Jan. 23, 2013.

(51) Int. Cl.
| | |
|---|---|
| *C08L 23/06* | (2006.01) |
| *C08K 3/22* | (2006.01) |
| *C08K 3/00* | (2006.01) |

(52) U.S. Cl.
CPC ............... *C08K 3/22* (2013.01); *C08K 3/0033* (2013.01); *C08K 2003/2265* (2013.01); *C08L 2207/068* (2013.01)

(58) Field of Classification Search
CPC ..................................... C08L 23/06; C08K 3/22
See application file for complete search history.

(56) References Cited

U.S. PATENT DOCUMENTS 3,660,073 A * 5/1972 Youngs .................... C22B 1/242  
                                                  252/1  
4,701,264 A * 10/1987 Braun ............................ 210/734

(Continued)

FOREIGN PATENT DOCUMENTS

| CN | 101134827 A | * | 3/2008 |
|---|---|---|---|
| CN | 101844012 A | * | 9/2010 |
| GB | 2068978 A | * | 8/1981 |

OTHER PUBLICATIONS

Machine translated English equivalent of CN 101844012 (Sep. 2010, 9 pages).*

(Continued)

*Primary Examiner* — Brieann R Fink  
(74) *Attorney, Agent, or Firm* — Arent Fox LLP

(57) ABSTRACT

The present invention relates to a composite material that comprises a polymeric constituent and iron ore powder. The polymeric constituent of the present invention is preferably UHMWPE. The iron ore powder used for the purposes of the present invention is the raw iron ore tailing resulting from iron ore pelletizing processes and it is used in an amount of 3-5% (w/w). The present invention is also related to the use of iron ore tailing in the preparation of composite materials comprising UHMWPE which presents improved properties such as creep resistance, stiffness and wear resistance, as well as cost reduction and reuses tailings of industrial plant. The present invention is also related to the use of the composite material of interest in the preparation of composite polymeric sheets for use in mining companies facilities.

18 Claims, 2 Drawing Sheets

(56) References Cited

U.S. PATENT DOCUMENTS

| | | | | |
|---|---|---|---|---|
| 5,393,473 | A | * | 2/1995 | Payer et al. ................... 264/117 |
| 5,453,234 | A | * | 9/1995 | Gusik ........................... 264/120 |
| 2005/0223937 | A1 | * | 10/2005 | Schmitt et al. .................... 106/3 |
| 2008/0179417 | A1 | * | 7/2008 | Bayer et al. ..................... 238/84 |
| 2008/0293866 | A1 | * | 11/2008 | DeVito et al. ................ 524/431 |
| 2009/0062431 | A1 | * | 3/2009 | Nasr et al. ......................... 524/8 |
| 2012/0228794 | A1 | * | 9/2012 | Martin et al. .................... 264/69 |
| 2014/0263683 | A1 | * | 9/2014 | Krishnan et al. ............... 238/91 |

OTHER PUBLICATIONS

Adedayo (Mechanical Properties of Iron Ore Tailings Filled-Polypropylene Composites. Journal of Minerals and Materals Characterization and Engineering, 2012, 11, pp. 671-678).*

FWA (User Guidelines for Waste and Byproduct Materials in Pavement Construction. U.S. Department of Transporation Federal Highway Administration. Apr. 23, 2012, 10 pages).*

Derwent Abstract for CN 101134827 (Acc No. 2009-A00753, 2009, 3 pages.).*

* cited by examiner

COMPOSITE MATERIAL COMPRISING UHMWPE AND IRON ORE TAILING AND USE OF IRON ORE TAILING IN PREPARATION OF COMPOSITE MATERIAL

CROSS-REFERENCE TO RELATED APPLICATIONS

This application is based upon and claims the benefit of priority of the U.S. Patent Application No. 61/755,803, filed Jan. 23, 2013, the disclosure of the prior application is hereby incorporated in its entirety by reference.

APPLICATION FIELD

The present invention relates to a composite material that comprises UHMWPE and iron ore tailing. This material presents improved properties such as creep resistance, stiffness and wear resistance, as well as cost reduction and reuses tailings of industrial plant.

BACKGROUND OF THE INVENTION

The mining industry is of great importance for the economy of many countries. Nevertheless, it is common knowledge that tailings, the material left over after the process of separating the valuable fraction from the uneconomic fraction of ores, are responsible for significant issues for the mining activities—both environmentally and economically. The incorporation of tailing in productive processes may reduce costs and open up new business opportunities, further it may reduce the volume of extraction of raw materials, preserving the limited natural resources.

Currently, it is also known that mining companies use polymeric sheets in their facilities, as in coating silos, channel of transfer conveyor belts, scrapers, screen rollers, plows, mixers, pellet discs, transfer points of ore and pellet, among other applications.

Nowadays, there are critical company concerns about the environment. There is an incessant quest for technologies in order that products and byproducts return to a closed sustainable cycle.

Recycling is a transformation opportunity of an important source of expenses into a revenue source or, at least, to reduce the deposition expenses.

Recycling processes for plastics or polymeric materials are known in the art and seek to reuse these materials in order to obtain recycled raw material that can return to the polymer manufacture production chain or can be used for other purposes with commercial interests.

The polyethylene (PE), is chemically the simpler polymer and is represented by the chain $(CH_2-CH_2)_n$. Due to its high worldwide production, it is also cheapest, being one of the most common types of plastic. It is obtained by ethylene polymerization (chemical formula $CH_2=CH_2$) which derives its name. The polyethylenes can be classified as PEBD, HDPE, PELBD, UHMWPE or PEX.

The High Density Polyethylene (HDPE, in Portuguese known as PEAD) presents density greater than 0.941 $g/cm^3$. PEAD has a low level of branching, with high density and high intermolecular forces. The high-density polyethylene (HDPE) is the second most recycled resin in the world. Applications for recycled HDPE have become more frequent and may be used to: flooring (mixed with asphalt), wood plastic, construction, automotive industry, manufacturing of industrial packaging, plastic bags, buckets, cards, etc. Recycled HDPE has also been applied in construction, to build structural elements.

UHMWPE is the acronym for Ultra High Molecular Weight Polyethylene. The extremely high molecular weight provides to this engineering plastic excellent mechanical properties, such as high wear resistance by abrasion, high impact resistance and low coefficient of friction.

In an attempt to find alternative ways of developing materials, the number of studies with composites materials involving tailing has intensified increasingly. The positive results have encouraged research centers and companies to invest in developing new composites and improving processing techniques to manufacture products with aggregated mechanical properties and economic viability.

The production of these composites is presented as an alternative for recycling, in view of the possibility to reuse some industrial tailing of interest. The manufacturing processes for obtaining composites usually involve extrusion or pressing routes.

Composites are materials designed to combine desirable features from two or more materials of different nature. Particulate materials can be conceptualized as particulate fillers, usually inorganic substances which are added to the polymer matrix, in order to alter their physical and mechanical properties. For some time this kind of material was employed in composites production with the primary function of reducing cost of the final product, since they diminished the amount of polymer used. However, over time, other functions have been attributed to these materials. Various types of particulate materials have been used as fillers in polymeric composites, such as calcium carbonate, talc, clay and micro spheres of glass, influencing positively in properties such as creep resistance, heat distortion temperature (HDT), thermal conductivity, and hardness, stiffness and wear resistance.

The present invention relates to a composite material that comprises polyethylenes and ore tailing. Preferably, the present invention relates to a composite material that comprises UHMWPE and iron ore tailing.

The technology that utilizes the coupling of additives in a polymer matrix in order to obtain improvements in the mechanical properties of new composites is becoming known in the prior art and particulate materials are already used for the production of polymeric composites.

Inorganic materials, like silicates, ceramics, talc, glass beads and inorganic fibers have already been described in the manufacture of commercial and engineering composites for many kinds of applications, according to the obtained properties.

Wang Lixin (CN103044926 and CN103044927) discloses an oil seal rubber material for automobile engines and a piston rubber material for mud pumps, which were produced with polymers, modified iron ore tailing powder, silica, carbon blacks, and tree ashes, among other components. The rubber materials which are disclosed by these inventions present good mechanical properties and resistance to high/low temperature, oil, solvents and chemicals, but they are made out of a combination of many different types of filler and directed to the automobilist industry.

The present invention relates to a new composite material that comprises polyethylenes, preferably Ultra High Molecular Weight Polyethylene (UHMWPE) with a reinforcement load of iron ore, preferably iron ore tailing. The present invention composite may be used for the manufacture of sheets or plates aiming to substitute the polymeric sheets usually made solely with HDPE and UHMWPE. The present invention also represents a useful and ecological application for formerly unused and pollutant byproducts resulting from ores pelletizing processes (especially iron ore pelletizing processes).

The present invention composite material reuses tailings of industrial plant, causing significant cost reductions in mining and significant environmental advantages because it allows recycling waste polymers too, which would take hundreds of years to decompose. It also surprisingly presents improved properties such as creep resistance, stiffness and wear resistance, which are important properties for substituting polymeric sheets used in mining companies facilities.

SUMMARY OF THE INVENTION

The present invention is related to a new composite material characterized by comprising a polymeric constituent and iron ore powder. The polymeric constituent is preferably UHMWPE, which has an average molecular weight of above $7.0 \times 10^6$ g/mol. The iron ore powder used for the purposes of the present invention is the raw iron ore tailing resulting from pelletizing processes and it is used in an amount of 3-5% (w/w), preferably 3% (w/w). The present invention is also related to the use of iron ore tailing in the preparation of composite materials comprising UHMWPE, which present improved properties such as creep resistance, stiffness and wear resistance. The present invention is also related to the use of the composite material of interest in the preparation of composite polymeric sheets for use in mining companies facilities.

Therefore, the present invention relates to a new composite material that comprises Ultra High Molecular Weight Polyethylene (UHMWPE) with a reinforcing filler of iron ore tailing, capable of replacing the polymeric sheets used in mining companies facilities commonly produced with HDPE and UHMWPE, reducing costs and reusing tailings of industrial plants. The incorporation of fine iron ore tailings to the polymeric material (UHMWPE) demonstrates feasibility of using the composite with a structural function. The addition of reinforcing filler improved properties such as creep resistance, stiffness and wear resistance, a very important characteristic for applications of the polymeric sheets. Additionally, the present invention relates to a process for the preparation of said composite material and the use of the iron ore tailing for the preparation of said composite material.

DETAILED DESCRIPTION OF THE INVENTION

Figure 1:
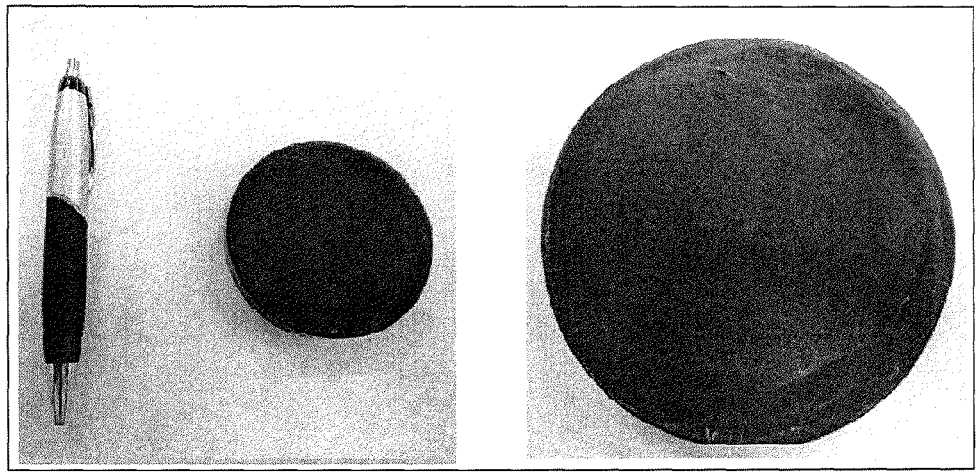
FIG. 1: Sample of UHMWPE composite with reinforcing filler of iron ore powder.

Mining companies currently use polymeric sheets (PEAD and UHMWPE) in their facilities, as in coating silos, channel of transfer conveyor belts, scrapers, screen rollers, plows, mixers, pellet discs, transfer points of ore and pellet, among other applications.

The present invention presents as objective a new composite material that comprises a polymeric constituent and iron ore powder. The present invention also presents as objective a new composite material comprising ultra-high molecular weight polyethylene (UHMWPE) with reinforcing filler of iron ore powder, capable of replacing the polymeric plates commonly produced with PEAD and UHMWPE.

The present invention composite material reuses tailings of industrial plant, causing significant cost reductions in mining. It may be used for the manufacture of sheets or plates used in mining companies facilities. It also brings significant environmental advantages because it allows recycling of both waste polymers (which would take hundreds of years to decompose) and byproducts resulted of ores pelletizing processes. The present invention also represents a useful and ecological application for byproducts resulted of ores pelletizing processes. It also surprisingly presents improved properties such as creep resistance, stiffness and wear resistance, which are important properties for substituting polymeric sheets used in mining companies facilities. Additionally, the present invention contributes for the development of new technologies and presents industrial potential for the manufacture of innovative products with reduced costs and reduced environmental liabilities.

The incorporation of iron ore powder to the polymeric material (UHMWPE) produces changes in the mechanical properties compared to the pure polymer, i.e., the reinforcing filler improve properties such as wear resistance, a very important feature for the applications of the polymeric sheets. The material is prepared by extrusion and/or pressing and the characterization is made by microstructural analysis, particle size analysis, scanning electronic microscopy (MEV), X-ray dispersive energy spectroscopy (EDX), resistance traction and wear resistance.

For the manufacturing of the present invention composite different alternatives of compositions have been evaluated. The preferred composition is characterized by comprising iron ore tailing and UHMWPE. The preferred iron ore powder of the present invention composition is considered the untreated raw iron ore tailing resulting from iron ore pelletizing processes. No additional preliminary processes are necessary for this iron ore powder when using it in the present invention composite.

The present invention composite is obtained through the extrusion or pressing of UHMWPE or HDPE with the raw iron ore tailing (not limiting the scope of the present invention). UHMWPE is the preferred polymeric constituent of the present invention composite.

A wide range of molecular weights of the polymeric material may be used for the manufacture of the present invention composite. For the purpose of the present invention the preferred UHMWPE has the average molecular weight of 7-9 million g/mol (>$7.0 \times 10^6$ g/mol).

Different particle sizes of the polymeric material may be used for the manufacture of the present invention composite. A commercial UHMWPE which is available with #132 microns average particle size may be used.

The favorite concentration of the raw iron ore powder used in the composite of the present invention is 3-5% (w/w) of the total polymeric material weight, being 3% (w/w) the preferred amount. At this concentration, the improved properties of the composite of interest may already be observed.

The particle size distribution of raw iron ore tailing may be variable but no benefits have been observed by using thinner tailing. Usually the average particle size obtained from iron ore pelletizing processes of 38 μm is adequate for the present invention composite.

Another object of the present invention is the use of iron ore tailing in the preparation of composite materials comprising UHMWPE, which presents improved properties such as creep resistance, stiffness and wear resistance.

The present invention also presents as objective the use of the composite material of interest in the preparation of composite polymeric sheets for use in mining companies facilities.

The following examples are presented in order to improve the clarity of the present invention scope without limiting it.

Figure 2:
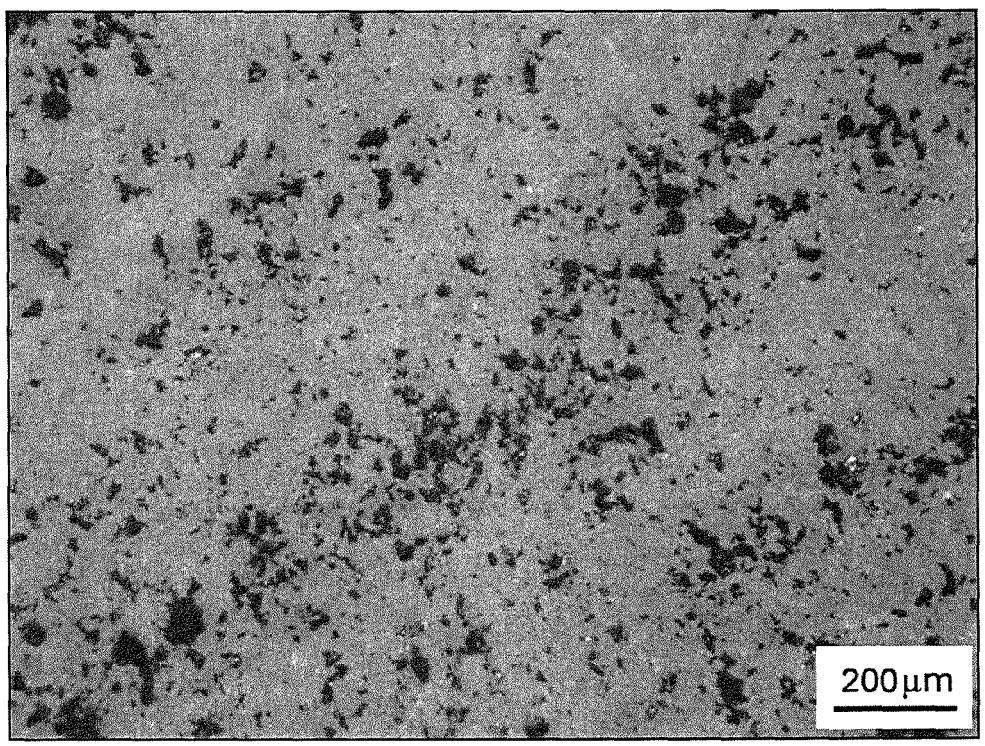
FIG. 2: Sample of UHMWPE composite with reinforcing filler of iron ore powder.
Figure 3:
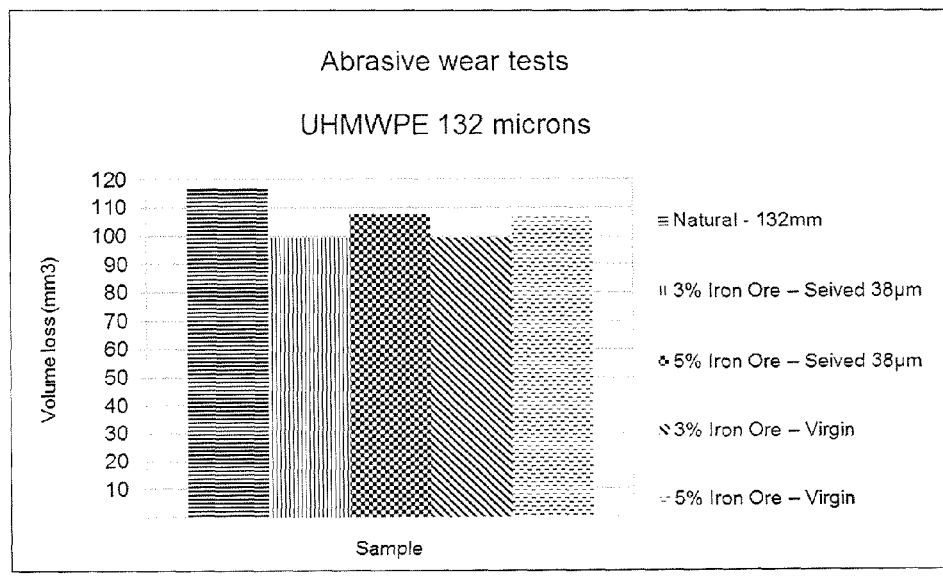
FIG. 3: Abrasive wear test results for natural UHMWPE polymer compared to UHMWPE composite with reinforcing filler of iron ore powder.
Figure 4:
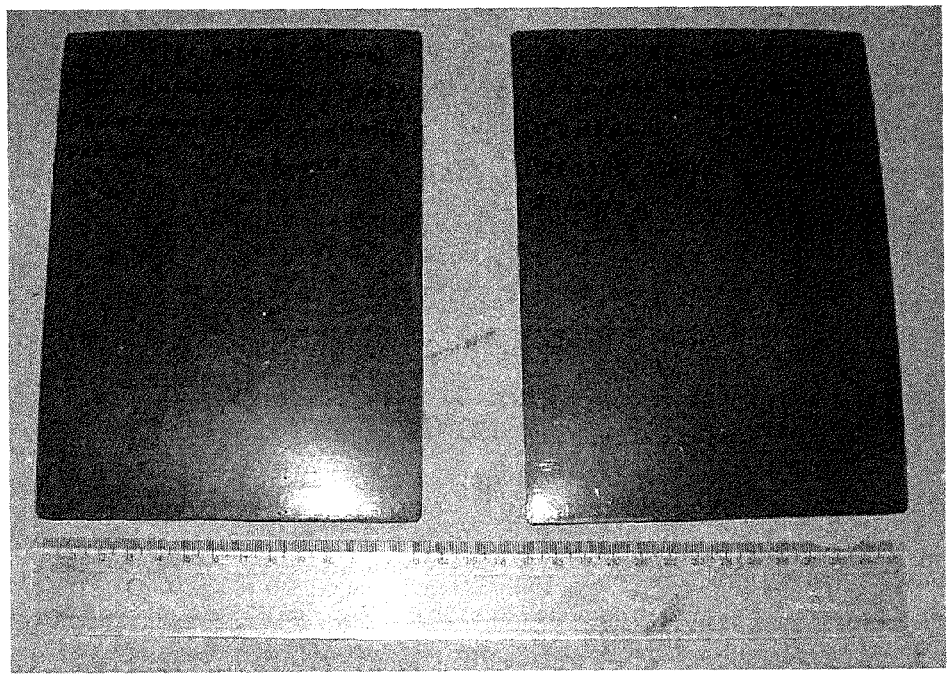
FIG. 4: Sample of UHMWPE powder manufactured with reinforced iron ore.

FIGS. 1, 2, 3 and 4 show the characteristics of UHMWPE, whereas FIG. 1 illustrates sample test specimens for measuring wear molded into tablet form with a diameter of 65 mm and thickness of 10 mm. FIG. 2 shows the microstructure of the composite of UHMWPE, FIG. 3 shows a variation of the amount of wear (losses in volume of the material) for different materials and composites (including virgin, natural resin without additive). The addition of iron ore contributes positively to the wear resistance of the material. The best performance is obtained with the composition of 3% of iron ore without the need for screening (cost reduction in the process) and FIG. 4 shows two sample plates manufactured from developed UHMWPE composite.

EXAMPLE 1

With the aim of analyzing the compatibility between the preferred polymeric matrix (UHMWPE) and the reinforcing material (iron ore powder), a composite material sample is made. The composite material according to the present invention is prepared by mixing 3% of (w/w) of raw iron ore tailing with UHMWPE having average molecular weight of 7-9 million g/mol ($>7.0 \times 10^6$ g/mol).

The equipment used was: ball mill, hydraulic press, mold and mud or sand oven type machine. The procedure for the characterization of particle size comprised the steps of: weighing the material, sieving and weighing of the material retained on each sieve and packing using a mechanical stirrer.

The mixture is submitted to RAM extrusion or pressing process to obtain the composite. The characterization of the obtained material is made by microstructural analysis, particle size analysis, scanning electron microscopy (MEV), energy dispersive spectroscopy X-ray (EDX), thermal analysis (DSC), tensile strength and wear resistance.

The samples for microstructure analysis were embedded in resin for characterization and comparison of the obtained material and provided similar results compared with the state-of-the-art available information.

The samples were subjected to microscopic optical micrographic analysis of reflection and scanning electron microscope (SEM).

The results of tensile strength were analyzed by determining the values of conventional yield strength (YS) limit of conventional tensile strength (TS), total elongation (S) and area reduction (AR). Measures of total elongation were made from an initial length of 20 mm marked on the specimen. Assays were performed in air at room temperature.

The composite of UHMWPE exhibited a significant increase in the wear performance due to improved compatibility of matrix particles. The use of the coupling agent resulted in a significant improvement of wear properties, stiffness and yield strength, comparing to the pure polymer. The particle size distribution of the raw iron ore tailing is found in Table 1.

TABLE 1

| Particle size distribution of the raw iron ore tailing of the composite. | |
|---|---|
| Opening (μm) | % retained mass |
| >90 | 10.05 |
| 75 | 5.52 |
| 53 | 5.03 |
| 45 | 16.08 |
| 38 | 32.16 |
| 32 | 18.09 |
| 25 | 7.54 |
| <25 | 4.52 |

Images showing a sample of UHMWPE composite with reinforcing filler of iron ore powder are illustrated in FIG. 1 and FIG. 2. It is possible verify from FIG. 2 the proper grip (compatibility) between the constituent materials.

EXAMPLE 2

With the aim of verifying the mechanical properties of the sample obtained in Example 1 (using iron ore tailing as reinforce filler for UHMWPE), resistance analysis are made.

The graphic presented in FIG. 3 illustrate abrasive wear test results for natural UHMWPE polymer compared to UHMWPE composite with reinforcing filler of iron ore powder. The results show that natural UHMWPE presents highest wear in a direct comparison through wear test, with the composite containing 3% iron ore screened to 38 microns, 5% ore screened to 38 microns iron, 3% iron ore in its raw state and 5% of iron ore in the rough. The composite containing 3% iron ore screened at 38 microns had the lowest wear.

The results presented in Table 2 demonstrate that the obtained material have the mechanical properties preserved but improved wear resistance.

TABLE 2

| tensile analysis results comparing natural UHMWPE material and UHMWPE reinforced with iron ore tailing filler | | | | | |
|---|---|---|---|---|---|
| Sample (Mpa) | Matrix | Reinforcement | S (%) | YS (Mpa) | TS |
| natural not reinforced | UHMW 132 μm | None | 263.8 | 21.3 | 26.3 |
| natural reinforced with iron ore | UHMW 132 | 3% of iron ore | 230.2 | 21.4 | 26.1 |

Once examples of the preferred aspects of the present invention were presented above it is noteworthy to mention that the scope of protection conferred by the present document encompasses all other alternative forms appropriate for the implementation of the invention, which is only defined and limited by the content of the attached set of claims.

These incorporations demonstrate the feasibility of the use of the present invention composite with structural function. They also demonstrate that the present invention may contribute to the development of new technologies and present industrial potentiality to manufacture new products with reduced costs.

What is claimed is:

1. A composite material for use in a mining process, comprising:
    a polymeric sheet comprising:
        ultra-high molecular weight polyethylene ("UHMWPE"); and
        iron ore powder in an amount of 3-5% (w/w).

2. The composite material according to claim 1, wherein the UHMWPE has an average molecular weight of above $7.0 \times 10^6$ g/mol.

3. The composite material according to claim 1, wherein the iron ore powder is raw iron ore tailing resulting from iron ore pelletizing processes.

4. The composite material according to claim 3, wherein the iron ore powder is in the amount of 3% (w/w).

5. A method of preparing a composite material for use in a mining process, comprising:
pelletizing iron ore including producing iron ore tailing as a byproduct of the pelletizing;
combining the iron ore tailing with ultra-high molecular weight polyethylene ("UHMWPE"), wherein the iron ore tailing is in an amount of 3-5% (w/w), and wherein the composite material has improved properties of creep resistance, stiffness and wear resistance as compared to UHMWPE alone; and
preparing the combined iron ore tailing and UHMWPE into a polymeric sheet.

6. A method of using the composite material according to claims 1, 2, 3 or 4, comprising:
preparing a composite polymeric sheet and using the polymeric sheet in a mining facility.

7. The method of claim 6, wherein using the sheets in a mining facility comprises using the sheets in at least one of coating silos, or channels of transfer conveyor belts, or scrapers, or screen rollers, or plows, or mixers, or pellet discs, or transfer points of ore and pellet.

8. The method of claim 6, wherein preparing sheets comprises at least one of extruding or pressing the composite material to form the sheets.

9. The method of claim 5, wherein the combining comprises mixing the iron ore tailing in the amount of 3% (w/w) with the UHMWPE having an average molecular weight of about $7.0 \times 10^6$ to $9.0 \times 10^6$ g/mol.

10. The method of claim 5, wherein the iron ore tailing has a particle size distribution, based on sieving, which ranges from about 25 μm to about 90 μm.

11. The method of claim 5, wherein the iron ore tailing has an average particle size, based on sieving, of about 38 μm.

12. The method of claim 11, wherein the UHMWPE has an average particle size of about 132 μm.

13. The composite material according to claim 1, wherein the iron ore tailing has a particle size distribution, based on sieving, which ranges from about 25 μm to about 90 μm.

14. The composite material according to claim 1, wherein the iron ore tailing has an average particle size, based on sieving, of about 38 μm.

15. The composite material according to claim 14, wherein the UHMWPE has an average particle size of about 132 μm.

16. The composite material according to claim 1, wherein the polymeric sheet has a thickness of about 10 mm.

17. The composite material according to claim 1, wherein the polymeric sheet is sized to support ore and pellets during mining processes.

18. The method of claim 5, wherein the iron ore tailing is untreated before combining the iron ore tailing with the ultra-high molecular weight polyethylene.

* * * * *